(12) United States Patent
Smith (10) Patent No.: US 10,794,436 B2
(45) Date of Patent: Oct. 6, 2020

(54) HYDRAULIC BRAKE AND DISCONNECT FOR ROTATIONAL MACHINES

(71) Applicant: Rolls-Royce Corporation, Indianapolis, IN (US)

(72) Inventor: Alan Smith, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 122 days.

(21) Appl. No.: 16/138,532

(22) Filed: Sep. 21, 2018

(65) Prior Publication Data

US 2020/0096062 A1    Mar. 26, 2020

(51) Int. Cl.
*F16D 48/02* (2006.01)

(52) U.S. Cl.
CPC ...... *F16D 48/02* (2013.01); *F16D 2048/0203* (2013.01); *F16D 2048/0221* (2013.01); *F16D 2048/0266* (2013.01); *F16D 2500/104* (2013.01); *F16D 2500/1026* (2013.01); *F16D 2500/308* (2013.01); *F16D 2500/314* (2013.01); *F16D 2500/316* (2013.01)

(58) Field of Classification Search
CPC ................................................ F16D 2500/314
See application file for complete search history.

(56) References Cited

U.S. PATENT DOCUMENTS

| | | | |
|---|---|---|---|
| 4,209,979 A | | 7/1980 | Woodhouse et al. |
| 5,358,455 A | * | 10/1994 | Lundstrom ........... F16D 25/082 |
| | | | 475/101 |
| 5,967,285 A | * | 10/1999 | Mohan ................ F16D 25/0638 |
| | | | 192/103 F |
| 6,578,654 B2 | * | 6/2003 | Porter ................ B60K 23/0808 |
| | | | 180/249 |
| 8,215,437 B2 | | 7/2012 | Watson et al. |
| 9,061,670 B2 | | 6/2015 | Strengert et al. |
| 9,670,904 B2 | | 6/2017 | Warfen |
| 9,729,096 B2 | | 8/2017 | Edwards |
| 2010/0021284 A1 | | 1/2010 | Watson et al. |
| 2014/0207350 A1 | * | 7/2014 | Dix ....................... F16D 48/066 |
| | | | 701/68 |
| 2015/0128580 A1 | | 5/2015 | Lacher |
| 2020/0099322 A1 | | 3/2020 | Smith |

* cited by examiner

*Primary Examiner* — Mark A Manley
(74) *Attorney, Agent, or Firm* — Brinks Gilson & Lione (57) ABSTRACT

A rotational system can include a shaft assembly rotationally coupling a first rotor, a second rotor, and a fluid pump. A fluid circuit can include the fluid pump that can be configured to motivate a working fluid through the fluid circuit. A pressurizing valve can be disposed downstream of the fluid pump wherein the rotational system can be configured to rotationally decouple the first rotor from the second rotor by closing the pressurizing valve. The pressurizing valve can be actuated by a controller. A method can include raising a pressure differential across a fluid pump driven by a shaft assembly thereby applying an increased braking torque to the shaft assembly. The pressure differential can be raised by actuating a valve in hydraulic communication with the fluid pump. The shaft assembly can rotationally couple a first rotor with a second rotor, and increasing the braking torque can decouple the rotors.

23 Claims, 6 Drawing Sheets

HYDRAULIC BRAKE AND DISCONNECT FOR ROTATIONAL MACHINES

CROSS-REFERENCE

The following copending patent application is related to and hereby incorporated by reference: U.S. Utility patent application Ser. No. 16/138,469, concurrently filed herewith, entitled: HYDRAULIC BRAKING AND POWER EXTRACTION FOR ROTATING MACHINES, inventor: Alan Smith.

BACKGROUND

Field of the Disclosure

Among other things, the present application discloses hydraulic assisted disconnects of rotating machines that have a cooling or lubrication circuit.

Description of Related Art

Gas turbine engines can be used to drive electric generator or electric machine rotational machines to provide auxiliary electrical power. Electric motors can drive a rotating component; such as fan blades of an aircraft system for aircraft boundary layer control or propulsion. For example, U.S. Pat. No. 9,729,096 to Edwards discloses an alternating current generator mechanically coupled with a gas turbine engine such that the gas turbine engine can be controlled to vary the frequency of electrical power produced by the generator.

SUMMARY

A rotational system can include a shaft assembly rotationally coupling a first rotor, a second rotor, and a fluid pump. A fluid circuit can include the fluid pump that can be configured to motivate a working fluid through the fluid circuit. A pressurizing valve can be disposed downstream of the fluid pump wherein the rotational system can be configured to rotationally decouple the first rotor from the second rotor by closing the pressurizing valve.

The rotational system can be configured such that the closing of the pressurizing valve increases a differential defined between pump outlet pressure and pump inlet pressure. The pressurizing valve can be actuated by a controller to increase pressure and rotationally decouple the first rotor from the second rotor in response to one or more of rotational speed exceedance, machine temperature exceedance, loss of coolant, loss of lubricating fluid, loss of coolant or lubrication fluid pressure, sensed failure mode, sensed operating condition requiring machine disconnect, or a command from an operator.

The pressurizing valve can be a binary gate valve or a binary diverter valve or a pressure regulating valve. The pressurizing valve can be a binary diverter valve with a first valve outlet leading to a heat exchanger for the working fluid and a second valve outlet leading to a hydraulic actuator that activates a rotor decouple mechanism. The decouple mechanism can be a disconnector disposed between consecutive shaft segments. The disconnector can be a shear section and/or a clutch assembly.

A method can include raising a pressure differential across a fluid pump driven by a shaft assembly thereby applying an increased braking torque to the shaft assembly. The pressure differential can be raised by actuating a valve in hydraulic communication with the fluid pump.

The shaft assembly can rotationally couple a first rotor with a second rotor, and increasing the braking torque can decouple the rotors. The shaft assembly can include a disconnector that is actuated by the raised pressure differential. The disconnector can be at least one of a shear section and a clutch assembly. The pressurizing valve can be actuated to trigger the disconnector by a controller in response to one or more of rotational speed exceedance, machine temperature exceedance, loss of coolant or lubricating fluid, loss of coolant or lubricating fluid pressure, sensed failure mode, sensed operating condition requiring machine disconnect, or a command from an operator.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, some Figures omit views of certain features.

DETAILED DESCRIPTION

Illustrative (i.e., example) embodiments are disclosed. The claims are not limited to the illustrative embodiments. Therefore, some implementations of the claims will have different features than in the illustrative embodiments. Changes to the claimed inventions can be made without departing from their spirit. The claims are intended to cover implementations with such changes.

At times, the present application uses directional terms (e.g., front, back, top, bottom, left, right, etc.) to give the reader context when viewing the Figures. Directional terms do not limit the claims. Any directional term can be replaced with a numbered term (e.g., left can be replaced with first, right can be replaced with second, and so on). Furthermore, any absolute term (e.g., high, low, etc.) can be replaced with a corresponding relative term (e.g., higher, lower, etc.).

Figure 1:
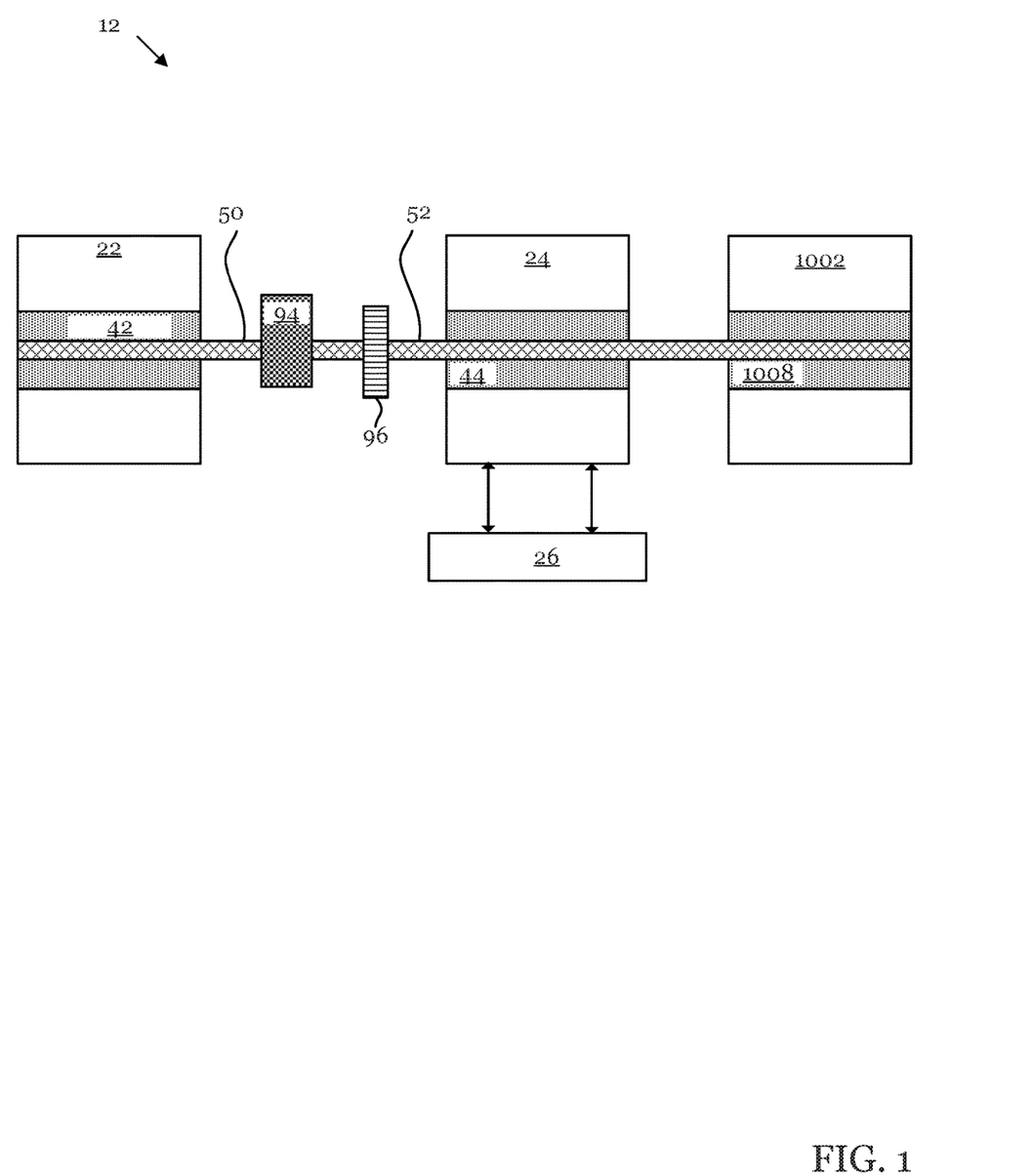
FIG. 1 is a block diagram of an exemplary rotational system.

Referring to FIG. 1, rotational system 12 can include a series of shafts for bi-directional mechanical power transfer between prime mover 22 and a component 24. Prime mover 22 powers mainshaft 50 that drives driveshaft 52 through gearbox 94. Component 24 can include rotor 44 that can be coupled to, and thus rotationally driven by, driveshaft 52. System 12 can be electrical, mechanical, and/or electromechanical. Component 26 can be configured for bi-directional electric power transfer to or from system 12.

Any component disclosed herein can be an assembly of subcomponents. For example, driveshaft 52 can include a series of shaft segments (i.e., shaft sections) coupled via one or more disconnectors 96 (e.g., clutches, shear sections).

A control system ("CS") 1002 can be configured to increase a braking load on at least a portion of driveshaft 52.

CS 1002 can also be configured to decouple prime mover 22 from component 24 by actuating the disconnector 96 along driveshaft 52.

CS 1002 can include a rotor 1008 (e.g., a fluid pump) mechanically coupled with, and thus rotationally driven by, driveshaft 52. CS 1002 can be configured to cause a deceleration event (e.g., actuate a disconnector 96) through impulse braking of rotor 1008. One or more disconnectors 96 (e.g., shear sections 96A or clutches 96B) can be disposed at any point along driveshaft 52. Exemplary features of CS 1002 are further discussed below.

Figure 2:
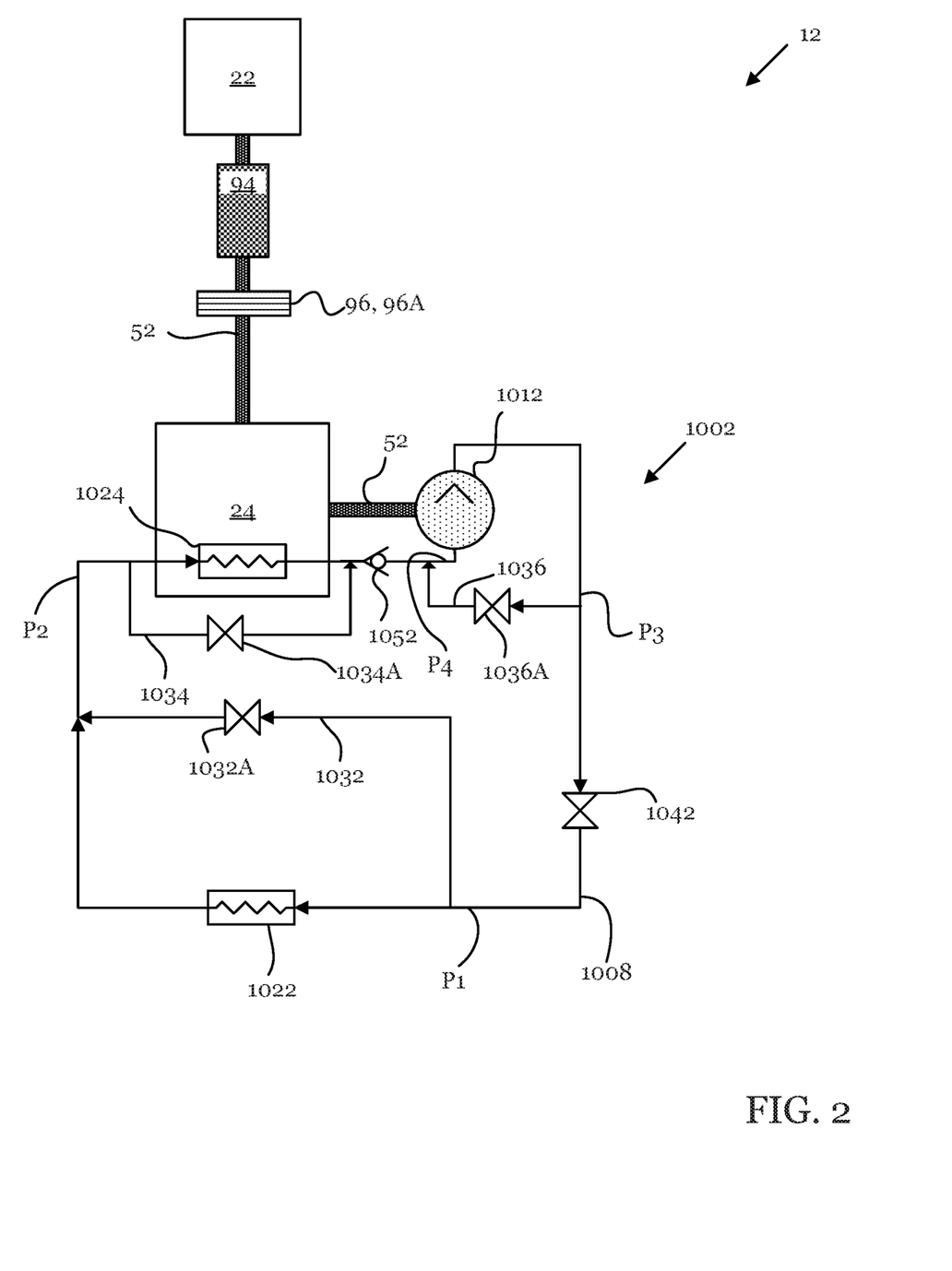
FIG. 2 is a schematic of a system including an exemplary fluid circuit.

FIG. 2 schematically illustrates system 12 which can include driveshaft (i.e., shaft assembly) 52 rotationally coupling rotors of prime mover 22, component 24, and CS 1002.

A disconnector 96 can be disposed between prime mover 22 and component 24. Prime mover 22 can be gas turbine engine that powers an auxiliary gearbox 94 that powers driveshaft 52. Disconnector 96 can be disposed along driveshaft 52 between gearbox 94 and component 24. Component 24 can be, for example, an electrical generator.

Disconnector 96 can be a shear section 96A (e.g., a torsionally weaker section) of driveshaft 52. Thus, driveshaft 52 can include a first portion (not labeled) on one side of shear section 96A and a second portion (not labeled) on an opposing side of shear section 96A. Driveshaft 52 can be configured such that shear section 96A self-destructs when subjected to torsion in excess of a predetermined quantity.

Disconnector 96 can also be a torque limiting device that disconnects when excessive torque is applied but can reconnect if the input and output speeds of the disconnector 96 match and the applied torque is below the torque limit, for example a dog clutch or jaw clutch Disconnector 96 can also be a torque limiting devise like a jaw clutch that remains disconnected until the input and output speeds match and the clutch is reset through mechanical, electrical or manual actuation.

CS 1002 can include a closed fluid circuit 1008. Fluid circuit 1008 can include a fluid pump 1012 (e.g., a liquid pump or a gas compressor) for pumping a working fluid through the system. Fluid pump 1012 can be a positive displacement fluid pump configured to pressurize the working fluid at a rate related to its speed.

A first heat exchanger 1022 can cool the working fluid. A second heat exchanger 1024 can heat the working fluid. In another embodiment (not shown), first heat exchanger 1022 can be disposed downstream of second heat exchanger 1024 and upstream of fluid pump 1012.

Second heat exchanger 1024 can heat the working fluid with energy extracted from component 24. Second heat exchanger 1024 can be a plate heat exchanger. Second heat exchanger 1024 can be a void or chamber defined in component 24 through which the working fluid flows. Second heat exchanger 1024 can be a void defined in a gear and/or bearing compartment of component 24 or prime mover 22. Therefore, the working fluid (e.g., oil) flowing in CS fluid circuit 1008 can function as both a bearing/gear lubricant and a bearing/gear coolant or as only a lubricant A first bypass assembly 1032 including a first pressure regulating valve 1032A can be configured to divert fluid about first heat exchanger 1022 based on pressure at point P1. A second bypass assembly 1034 including a second pressure regulating valve 1034A can be configured to divert fluid about second heat exchanger 1024 based on pressure at point P2. A third bypass assembly 1036 including a third pressure regulating valve 1036A can be configured to directly fluidly communicate the outlet of fluid pump 1012 with the inlet of fluid pump 1012 based on pressure at point P3, thus providing a circuit bypass from pump outlet to pump inlet to avoid excessive pressures at P3. The setpoint of one or more of the pressure regulating valves can be mechanically adjusted by tightening or relaxing an internal spring. As one possible alternative, the setpoint of one or more of the pressure regulating valves can be electrically adjusted. A one-way valve 1052 can be disposed directly upstream of the outlet of third bypass assembly 1036.

Figure 4:
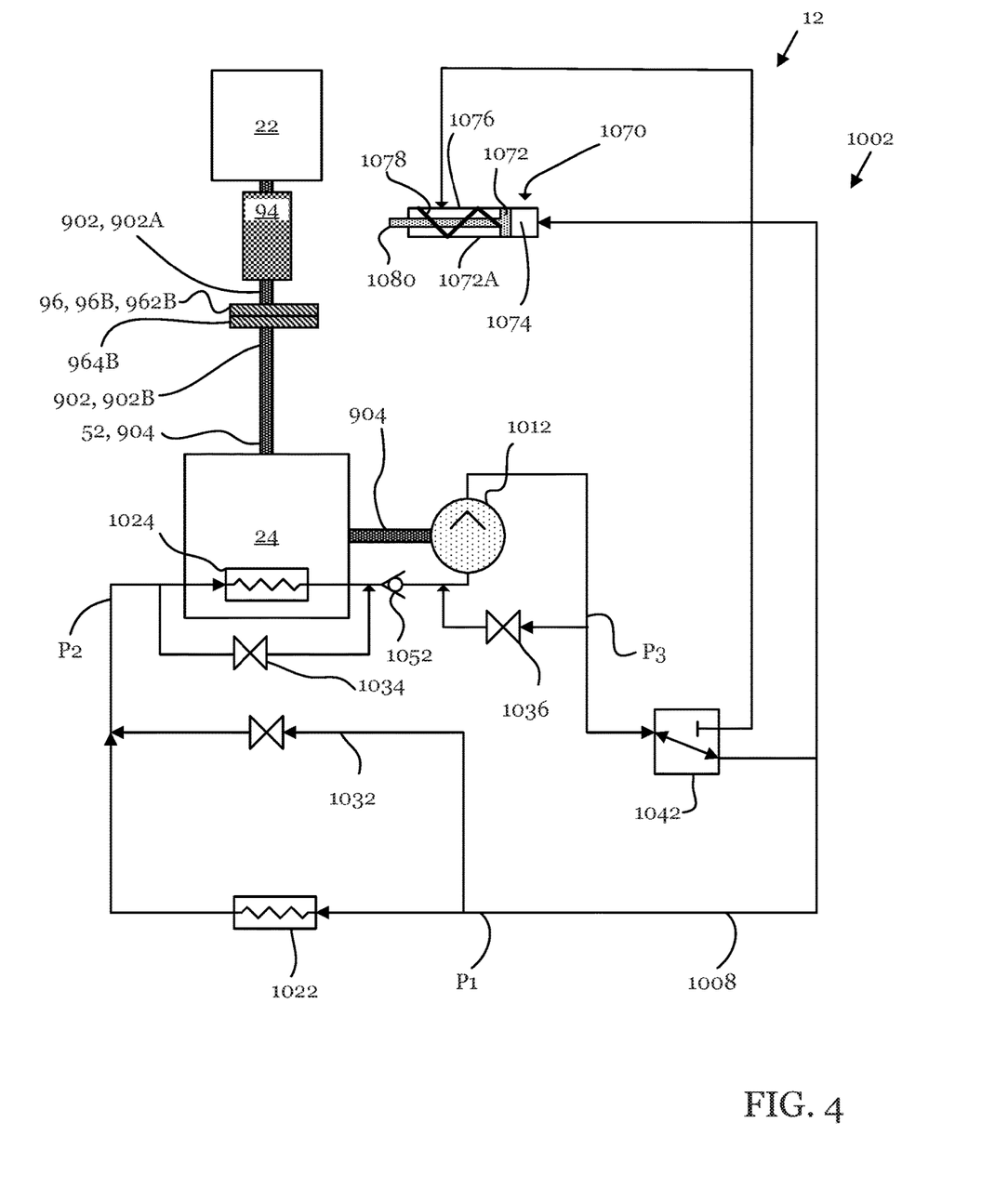
FIG. 4 is a schematic of a system including an exemplary fluid circuit.

A pressurizing valve 1042 can be disposed directly downstream of fluid pump 1012. A processing system ("PS") 2000 can electronically control the state of pressurizing valve 1042. Pressurizing valve 1042 can be a binary gate valve, and thus configured to exist only in a fully open and fully closed state. Alternatively, pressurizing valve 1042 can be a variable opening valve, and thus configured to assume a range of opening/closing states. Referring to FIG. 4, pressurizing valve 1042 can be a binary-state three-way diverter valve with one outlet leading to an actuator 1070 to provide the force to activate the disconnector 96, and another outlet leading to first heat exchanger 1022.

During operation of system 10, pressurizing valve 1042 can be fully open and thus directing fluid toward first heat exchanger 1022 (if pressurizing valve 1042 is a three-way valve, then fully open can mean the outlet leading toward first heat exchanger 1022 is fully open while the outlet leading to actuator 1070 is fully closed). Based on a command from PS 2000, pressurizing valve 1042 can at least partially close (if pressurizing valve 1042 is a three-way valve, then partially/fully closing can respectively mean partially/fully closing the outlet leading toward first heat exchanger 1022 while partially/fully opening the outlet towards actuator 1070).

When pressurizing valve 1042 is less than fully open, the flow of working fluid can be restricted, raising the pressure at the outlet of fluid pump 1012 (i.e., at point P3). The pressure at P3 can be limited by the action of the third pressure relief valve 1036A or if the pressurizing valve 1042 opens. When pressurizing valve 1042 is quickly closed (e.g., closed in less than a second), the pump outlet pressure can increase by one or more (e.g., two, three) orders of magnitude.

Fluid pump 1012 can exert a braking torque against driveshaft 52 which may approximately equal the torque demand of fluid pump 1012. Torque demanded by fluid pump 1012 can increase with the rising disparity between pump outlet and pump inlet pressures (i.e., P3 vs. P4). When pressurizing valve 1042 is closed, the torque demand of fluid pump 1012 can increase and thus the braking torque exerted by fluid pump 1012 against driveshaft 1012 can increase.

The braking torque can be in a direction opposite the rotational inertia of driveshaft 52 and/or the accelerative torque exerted on driveshaft 52 by prime mover 22 (e.g., the accelerative torque applied to driveshaft 52 by a turbine), resulting in driveshaft torsion. Due to the torsion, driveshaft 52 can sever at shear section 96A, its torsionally weakest point. As shown in FIG. 2, the severing (i.e., breaking) of driveshaft 52 at shear section 96 can mechanically decouple prime mover 22 from component 24. Shear section 96A can be, for example, a segment of driveshaft 52 made with a reduced diameter and/or from a material with a lesser shear strength (e.g., a torque fuse).

Figure 3:
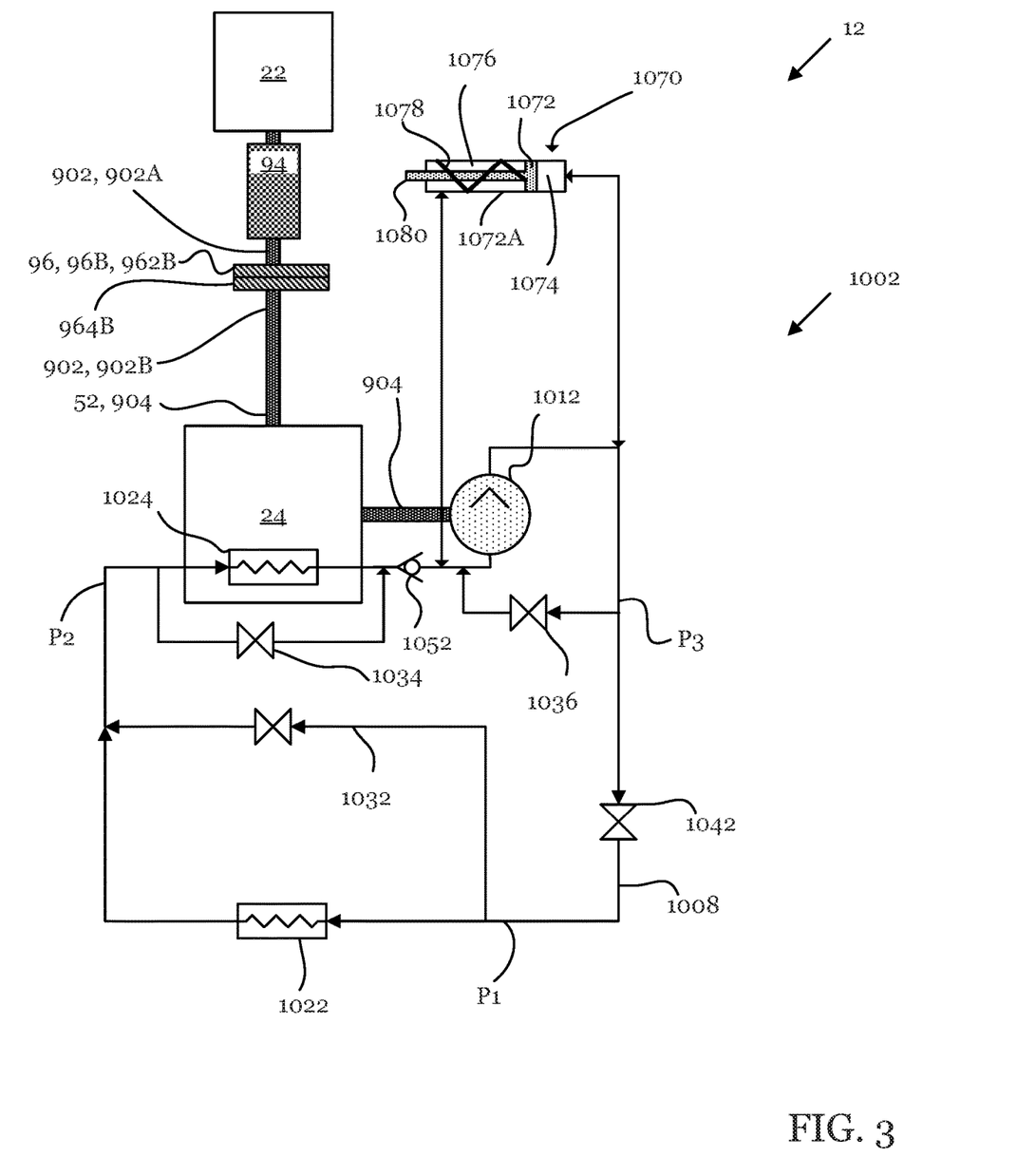
FIG. 3 is a schematic of a system including an exemplary fluid circuit.

Referring to FIG. 3, disconnector 96 can be a mechanically controlled clutch (i.e., clutch assembly) 96B. According to some embodiments, disconnector 96 can include a mechanically controlled clutch 96B and a shear section 96A disposed in series along driveshaft 52. According to other embodiments, disconnector 96 can include only one of clutch 96B and shear section 96A.

Clutch assembly 96B can include opposing clutch plates 962B, 964B actuatable between an engaged and a disengaged state. When clutch plates 962B, 964B are in the engaged state, clutch assembly 96B can transmit torque between first and second portions 902A, 902B of first shaft segment 902. Upon actuation, clutch plates 962B, 964B can separate, decoupling first and second shaft portions 902A, 902B and severing the mechanical link between prime mover 22 and component 24.

Figure 5:
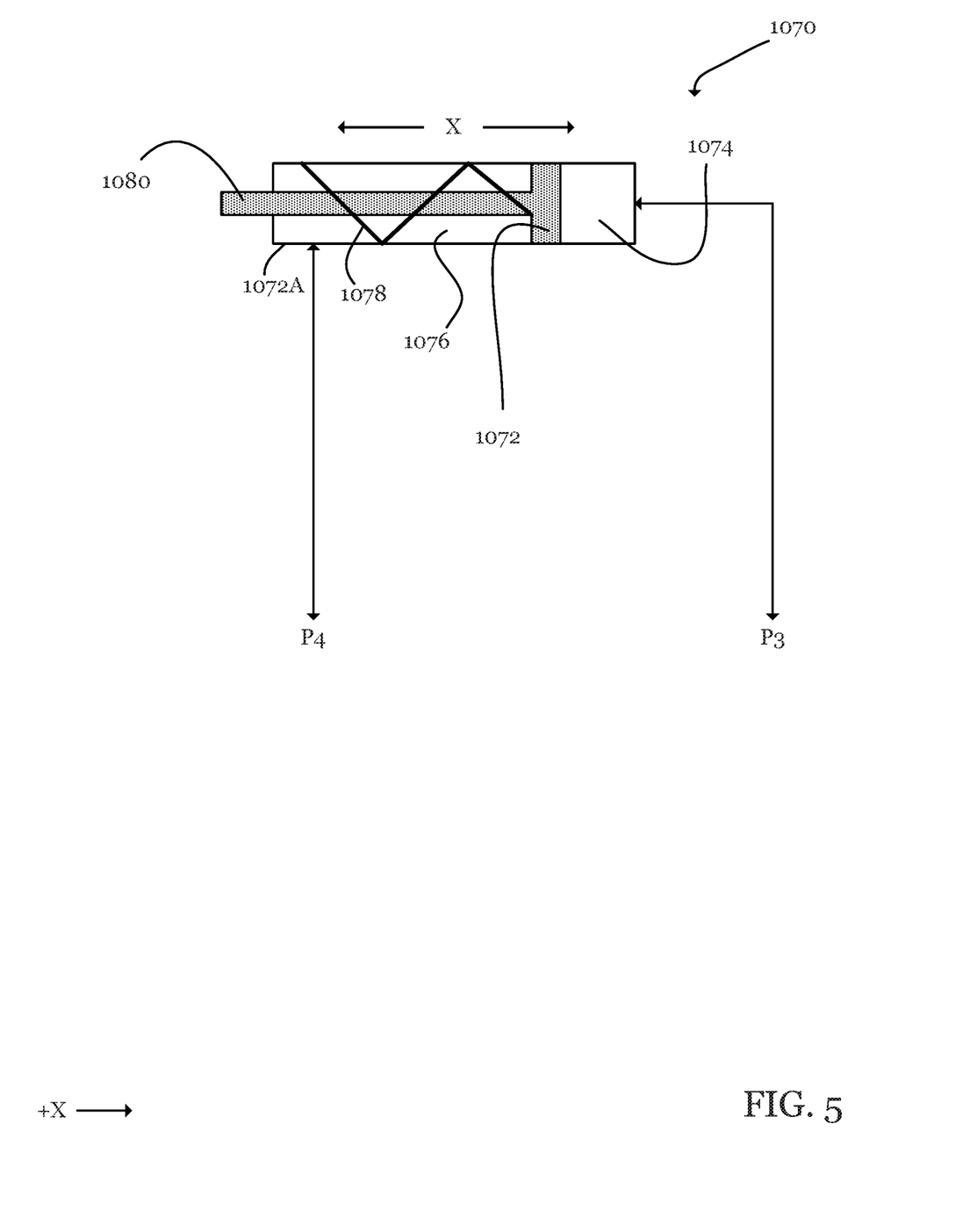
FIG. 5 is a schematic of an exemplary hydraulic actuator.

CS 1002 can include an actuator 1070 for mechanically controlling clutch assembly 96. Referring to FIGS. 3 and 5, actuator 1070 can include a piston assembly. The piston assembly can include a piston head 1072 circumferentially sealing against an outer cylinder 1072A to fluidly separate a first chamber of high pressure region 1074 from a second chamber of low pressure region 1076.

High pressure region 1074 can be in hydraulic (i.e., fluid) communication with the pump outlet (i.e., point P3). Low pressure region 1076 can be in hydraulic communication with the pump inlet (i.e., point P4). Referring to FIG. 5, spring 1078 can bias piston head 1072 in the positive X direction to retract the actuator and reduce the volume of high pressure region 1074.

A rod 1080 can be secured to piston head 1072. Rod 1080 can be coupled to a mechanical linkage (not shown) configured to actuate the clutch assembly 96B. Therefore, the position of piston head 1072 (and thus piston rod 1080) along the X-axis in FIG. 5 can govern the engagement state of clutch assembly 96B. Thus the clutch can be actuated based on the differential pressure across the piston head 1072.

If, for example, third pressure relief valve 1036 opens (or pressurizing valve 1042 opens), the high and low pressure regions 1074, 1076 can equalize, enabling spring 1078 to return piston head 1072 to a position whereupon the actuator can reengage clutch plates 962B, 964B.

FIG. 4 illustrates system 12 wherein pressurizing valve 1042 can be a binary-state three-way diverter valve with one outlet leading to an actuator 1070 to provide the force to activate the disconnector 96 by retracting actuator 1070, and another outlet leading to first heat exchanger 1022.

If the actuator spring 1078 is positioned as in FIG. 4 then the spring could also activate the disconnector 96 by retracting the actuator in the event there was no pressure in the hydraulic circuit, for example if the shaft 904 driving pump 1012 fails causing the pump to stop rotating or if there is loss of pressure due to a leak in fluid circuit 1008.

In another embodiment, not shown, a spring can be located to extend the actuator 1070 to ensure that the disconnector 96 remains deactivated or connected in the event of pressure loss in circuit 1008.

PS 2000 can control pressurizing valve 1042 based on metrics of prime mover 22 or component 24. Exemplary features of PS 2000 are further discussed below. Whenever the present disclosure discusses a certain metric (e.g., rotational speed, temperature, pressure), PS 2000 can include a sensor configured to measure the discussed metric.

PS 2000 can monitor a rotational speed of driveshaft 52. If the rotational speed of driveshaft 52 exceeds a predetermined value, then PS 2000 can close pressurizing valve 1042 to trigger deceleration (e.g., decoupling of driveshaft 52 at disconnector 96).

PS 2000 can use working fluid pressure in CS 1002 as a proxy for shaft rotational speed. Therefore, according to some embodiments, PS 2000 can trigger deceleration (e.g., decoupling of driveshaft 52 at disconnector 96) in response to fluid pressure at any of points P1, P2, and P3 exceeding a predetermined value. PS 2000 can trigger deceleration in response to determining (e.g., estimating) that a current temperature of first prime mover 22 or second component 24 exceeds a first predetermined value and/or a rate of temperature increase of first prime mover 22 or second component 24 exceeds a second predetermined value. PS 2000 can also trigger deceleration or disconnect in response to detecting certain chemicals/compounds (e.g., carbon monoxide or smoke) or due to detecting a light flash caused by electrical arcing.

PS 2000 can trigger deceleration or disconnect based on a voltage or amperage or power generation metric of prime mover 22 or component 24 or electrical component 26. For example, PS 2000 can enter the second operating state based on determining that electric machine 24 is supplying an excessive amount of electrical power (i.e., to prevent an electrical failure such as a short circuit). To do so, PS 2000 can (a) determine or estimate the amount of electricity generated by electric machine 24, or based on rotational speed of driveshaft 52 or (b) determine the voltage or amperage or power of electrical component 26. If voltage or amperage or power exceeds the respective voltage or amperage or power limits by a predetermined amount, then PS 2000 can enter the second operating state to decelerate electric machine 24.

PS 2000 can trigger deceleration or disconnect based on a sensed failure mode.

PS 2000 can trigger deceleration or disconnect based on a sensed operating condition to unload the prime mover.

PS 2000 can trigger deceleration or disconnect based on command from a pilot or operator.

Figure 6:
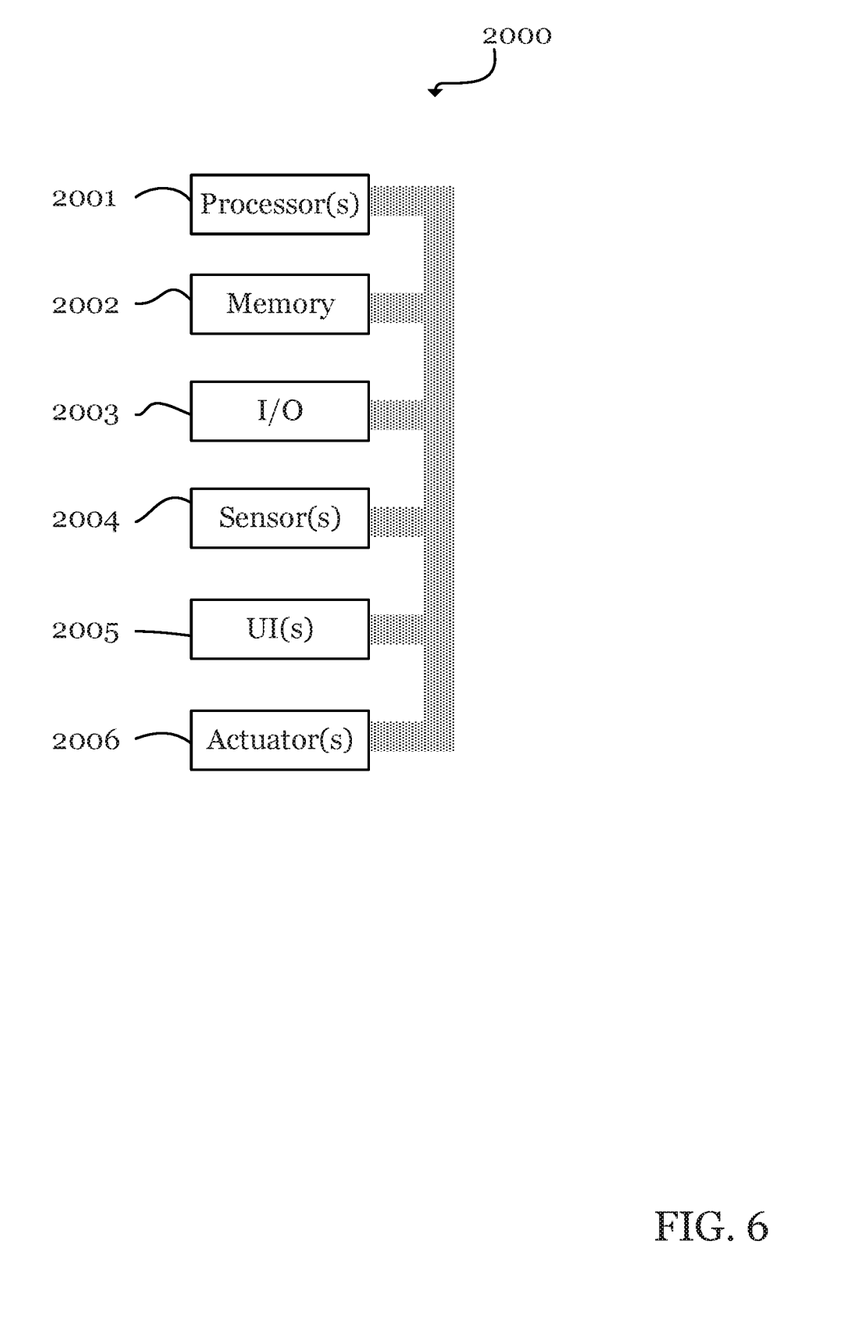
FIG. 6 is a block diagram of an exemplary processing system.

Referring to FIG. 6, system 20 can include processing system ("PS") 2000. Referring to FIG. 6, PS 2000 can include one or more processors 2001, memory 2002, one or more input/output devices 2003, one or more sensors 2004, one or more user interfaces 2005, and one or more actuators 2006.

Processors 2001 can include one or more distinct processors, each having one or more cores. Each of the distinct processors can have the same or different structure. Processors 2001 can include one or more central processing units (CPUs), one or more graphics processing units (GPUs), circuitry (e.g., application specific integrated circuits (ASICs)), FPGA, digital signal processors (DSPs), and the like. Processors 2001 can be mounted on a common substrate or to different substrates.

Processors 2001 are configured to perform a certain function, method, or operation at least when one of the one or more of the distinct processors is capable of executing code, stored on memory 2002 embodying the function, method, or operation. Processors 2001 can be configured to perform any and all functions, methods, and operations disclosed herein.

For example, when the present disclosure states that PS 2000 performs/can perform task "X", such a statement should be understood to disclose that PS 2000 can be configured to perform task "X". PS 2000 is configured to perform a function, method, or operation at least when processors 2001 are configured to do the same.

Memory 2002 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 2002 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 2002.

Input-output devices 2003 can include any component for trafficking data such as ports, antennas (i.e., transceivers), printed conductive paths, and the like. Input-output devices 2003 can enable wired communication via USB®, DisplayPort®, HDMI®, Ethernet, and the like. Input-output devices 2003 can enable electronic, optical, magnetic, and holographic, communication with suitable memory 2003. Input-output devices 2003 can enable wireless communication via WiFi®, Bluetooth®, NFC®, cellular (e.g., LTE®, CDMA®, GSM®, WiMax®), GPS and the like. Input-output devices 2003 can include wired and/or wireless communication pathways.

Sensors 2004 can capture physical measurements of environment and report the same to processors 2001. Examples of sensors 2004 include rotational sensors, pressure sensors, temperature sensors, flow rate sensors, which can be disposed at any (e.g., every) point corresponding to a discussed metric. User interface 2005 can include a display (e.g., LED touchscreens (e.g., OLED touchscreens), physical buttons, speakers, microphones, keyboards, and the like.

Actuators 2006 can enable processors 2001 to control mechanical forces. For example, actuators can be electronically controllable motors disposed in pumps and valves. Every valve and pump discussed herein can be independently controllable by PS 2000.

PS 2000 can be distributed. For example, some elements of PS 2000 can be disposed inside an aircraft body while other elements of PS 2000 can be disposed in an engine. PS 2000 can have a modular design where certain features have a plurality of the aspects shown in FIG. 6. For example, I/O modules can include volatile memory and one or more processors.

I claim:

1. A rotational system comprising: a shaft assembly rotationally coupling a first rotor, a second rotor, and a fluid pump; and a fluid circuit comprising: the fluid pump, which is configured to motivate a working fluid through the fluid circuit, the fluid pump comprising a pump inlet and a pump outlet; and a pressurizing valve disposed downstream of the fluid pump, wherein the rotational system is configured to rotationally decouple the first rotor and the fluid pump from the second rotor by closing the pressurizing valve, the rotational system configured to rotationally decouple the first rotor from the second rotor in response to an increase in a pressure differential across the fluid pump.

2. The rotational system of claim 1 configured such that the closing of the pressurizing valve increases a differential defined between pump outlet pressure and pump inlet pressure.

3. The rotational system of claim 2 wherein the pressurizing valve is actuated by a controller to increase pressure and rotationally decouple the first rotor from the second rotor in response to one or more of rotational speed exceedance, machine temperature exceedance, loss of coolant or lubricating fluid, loss of coolant or lubricating fluid pressure, sensed failure mode, sensed operating condition requiring machine disconnect, or a command from an operator.

4. The rotational system of claim 2, wherein the pressurizing valve comprises a binary gate valve or a binary diverter valve or a pressure regulating valve.

5. The rotational system of claim 4, comprising
a pump bypass assembly comprising a pressure relief valve disposed along a bypass line directly connecting the pump outlet with the pump inlet; and
a rotor decouple mechanism being configured to mechanically decouple the first rotor from the second rotor,
wherein the pressurizing valve comprises a binary diverter valve with a first valve outlet leading to a heat exchanger for the working fluid and a second valve outlet leading to a hydraulic actuator that activates a rotor decouple mechanism.

6. The rotational system of claim 1, wherein a first component comprises the first rotor and the fluid circuit is configured to absorb heat from the first component into the working fluid.

7. The rotational system of claim 1, wherein the fluid circuit is configured to flow the working fluid into direct contact with the first rotor, the working fluid both cooling and lubricating the first rotor.

8. The rotational system of claim 1, wherein the fluid circuit includes an accumulator to provide a reference pressure at a point in the fluid circuit and to absorb or release coolant due to liquid expansion or actuator movement.

9. The rotational system of claim 1, wherein the shaft assembly comprises a disconnector disposed between consecutive shaft segments.

10. The rotational system of claim 9, wherein the disconnector comprises a shear section and/or a clutch assembly.

11. The rotational system of claim 1 comprising an actuator assembly in hydraulic communication with the pump outlet, the actuator assembly configured to rotationally decouple the first rotor from the second rotor.

12. The rotational system of claim 11, wherein the actuator assembly is configured to rotationally decouple the first rotor from the second rotor by disengaging a clutch assembly disposed along a shaft segment of the shaft assembly.

13. The rotational system of claim 12, wherein the actuator assembly comprises a piston assembly in direct hydraulic communication with both the pump outlet and the pump inlet.

14. The rotational system of claim 13 where the hydraulic actuator assembly is configured to extend or retract to decouple the first rotor and the second rotor.

15. The rotational system of claim 13 where the hydraulic actuator assembly comprises a spring configured to decouple the rotors first rotor and the second rotor in the event of pressure loss.

16. The rotational system of claim 13 where the hydraulic actuator assembly also functions as an accumulator for the rotational system.

17. In a rotational system comprising a fluid circuit and a shaft assembly rotationally coupling a first rotor with a second rotor, a method of decelerating the first rotor, the method comprising:
raising a pressure differential across a fluid pump driven by the shaft assembly by closing a valve in hydraulic communication with the fluid pump; and
decelerating the first rotor and the fluid pump in response to closing the hydraulic valve and raising the pressure differential across the fluid pump.

18. The method of claim 17, wherein the shaft assembly comprises a disconnector, the method comprising decelerating the first rotor by triggering the disconnector with the raised pressure differential.

19. The method of claim 18, wherein the disconnector comprises at least one of a shear section and a clutch assembly.

20. The method of claim 18, wherein the disconnector comprises a clutch assembly, the method comprising triggering the disconnector by actuating a piston assembly linked to the clutch assembly with the raised pressure differential.

21. The method of claim 18 where the fluid circuit provides cooling or lubrication or both to a component of the rotational system.

22. The method of claim 18 where the valve is actuated to trigger the disconnector by a controller in response to one or more of rotational speed exceedance, machine temperature exceedance, loss of coolant or lubricating fluid, loss of coolant or lubricating fluid pressure, sensed failure mode, sensed operating condition requiring machine disconnect, or a command from an operator.

23. A method for decoupling a rotational system, wherein the rotational system comprises a shaft assembly rotationally coupling a first rotor with a second rotor and a fluid pump at least prior to the decoupling, the method comprising:

motivating a working fluid through a fluid circuit via the fluid pump, wherein the fluid circuit comprises the fluid pump and a pressurizing valve, wherein the fluid pump comprises a pump inlet and a pump outlet and the pressurizing valve is disposed downstream of the fluid pump; and rotationally decoupling the first rotor and the fluid pump from the second rotor by closing a pressurizing valve of the rotational system, wherein the first rotor and the second rotor are decoupled in response to an increase in a pressure differential across the fluid pump of the rotational system.

* * * * *